United States Patent
Dennehy et al.

(10) Patent No.: US 11,142,185 B2
(45) Date of Patent: Oct. 12, 2021

(54) METHOD OF CONTROLLING A HYBRID VEHICLE

(71) Applicant: Jaguar Land Rover Limited, Coventry (GB)

(72) Inventors: Dan Dennehy, Coventry (GB); Steve Liggins, Coventry (GB); David Armstrong, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 59 days.

(21) Appl. No.: 16/163,114

(22) Filed: Oct. 17, 2018

(65) Prior Publication Data
US 2019/0161074 A1   May 30, 2019

(30) Foreign Application Priority Data
Nov. 24, 2017   (GB) .................................. 1719514

(51) Int. Cl.
*B60W 20/40*   (2016.01)
*B60W 20/15*   (2016.01)
(Continued)

(52) U.S. Cl.
CPC .............. *B60W 20/40* (2013.01); *B60K 6/387* (2013.01); *B60K 6/547* (2013.01); *B60W 10/06* (2013.01); *B60W 10/08* (2013.01); *B60W 10/111* (2013.01); *B60W 20/10* (2013.01); *B60W 20/15* (2016.01); *B60W 30/182* (2013.01);
(Continued)

(58) Field of Classification Search
CPC ...... B60W 10/06; B60W 10/08; B60W 10/11; B60W 10/119; B60W 10/14; B60W 10/26; B60W 20/10; B60W 20/20; B60W 20/30; B60W 20/40; B60W 30/182; B60W 2510/08; B60W 2510/1005; B60W 2710/06; B60W 50/082
See application file for complete search history.

(56) References Cited

U.S. PATENT DOCUMENTS 6,000,296 A * 12/1999 Sundquist .............. B60K 20/04
                                                     180/233
6,533,692 B1 * 3/2003 Bowen ..................... B60K 6/26
                                                     475/5
(Continued)

FOREIGN PATENT DOCUMENTS

DE   10 2016 104 717 A1   9/2016
DE   11 2011 105 086 B4   10/2017

OTHER PUBLICATIONS

Search Report and English language translation, DE Application No. 10 2018 218 742.8, dated Oct. 30, 2019, 22 pp.
(Continued)

*Primary Examiner* — Edwin A Young
(74) *Attorney, Agent, or Firm* — McCoy Russell LLP

(57) ABSTRACT

The present application describes a method of controlling a vehicle, wherein the vehicle comprises a hybrid powertrain including an electric propulsion system, an engine and a drivetrain that is configurable in a low-range mode or a high-range mode. The method comprises determining whether the low-range mode for the drivetrain is selected, determining whether an electric mode for the powertrain is selected, and inhibiting operation of the engine if both the low-range mode and the electric mode are selected.

18 Claims, 2 Drawing Sheets

(51) Int. Cl.
*B60W 30/182* (2020.01)
*B60W 40/06* (2012.01)
*B60W 20/10* (2016.01)
*B60W 10/111* (2012.01)
*B60W 10/06* (2006.01)
*B60K 6/547* (2007.10)
*B60W 10/08* (2006.01)
*B60W 50/08* (2020.01)
*B60K 6/387* (2007.10)
*B60K 6/48* (2007.10)

(52) U.S. Cl.
CPC .......... *B60W 40/06* (2013.01); *B60W 50/082* (2013.01); *B60K 2006/4825* (2013.01); *B60W 2510/244* (2013.01); *B60W 2520/10* (2013.01); *B60W 2552/40* (2020.02)

(56) References Cited

U.S. PATENT DOCUMENTS

| | | | |
|---|---|---|---|
| 2003/0085062 A1* | 5/2003 | Bowen | B60K 23/0808 180/65.1 |
| 2008/0207373 A1 | 8/2008 | Conlon | |
| 2009/0082171 A1* | 3/2009 | Conlon | B60K 6/442 477/5 |
| 2013/0296118 A1 | 11/2013 | Pietron et al. | |
| 2016/0200315 A1 | 7/2016 | Fracchia et al. | |
| 2019/0011044 A1* | 1/2019 | Ando | F16H 37/065 |

OTHER PUBLICATIONS

Patents Act 1977: Combined Search and Examination Report under Sections 17 and 18(3), UKIPO Application No. 1719514.0, dated May 24, 2018, 5.

* cited by examiner

METHOD OF CONTROLLING A HYBRID VEHICLE

CROSS-REFERENCE TO RELATED APPLICATION

This application claims priority under 35 U.S.C. § 119 to Great Britain Application No. 1719514.0, filed Nov. 24, 2017, the content of which is incorporated herein by reference in its entirety.

TECHNICAL FIELD

The present disclosure relates to a control system and related method of controlling a hybrid vehicle. In particular, the disclosure relates to control of a vehicle comprising a hybrid powertrain including an electric propulsion system, an engine and a drivetrain that is configurable in a low-range mode. Aspects of the invention relate to a method, to a control system, to a computer program product, to a non-transitory computer readable medium, and to a processor.

BACKGROUND

Hybrid vehicles are equipped with powertrains that utilise multiple sources of motive power to achieve propulsion. For example, a hybrid powertrain may comprise a combustion engine for generating torque from chemical energy contained in combustion fuel, as well as an electric propulsion system comprising one or more electric motors for generating torque from electrical energy. The sources of motive power can be used separately or in parallel to define a range of operating modes.

Typically, hybrid vehicles operate in an electric-only mode so that the vehicle is driven solely by the electric propulsion system when travelling at low speed, for example up to approximately 25 miles per hour. At a threshold speed, the powertrain transitions into a parallel mode in which the combustion engine operates alongside the electric propulsion system to propel the vehicle. Any excess power generated by the engine when operating in the parallel mode is often used to recharge batteries that power the electric propulsion system.

It can be less clear how to manage transitions between electric-only mode and parallel mode operation in vehicles having a drivetrain that is configurable in a low-range mode. In such arrangements, a transfer box of the drivetrain can select a set of low-range gears that enables the engine and electric propulsion system to operate within their normal ranges whilst the vehicle travels at low speed. This is particularly useful for off-road driving, for example. Conversely, for normal driving the transfer box is configurable in a high-range mode.

One approach is to force the powertrain to operate in the parallel mode if the drivetrain is configured in the low-range mode. This ensures that maximum power is available at all times, which may be useful in certain circumstances during off-road driving such as when driving on sand. However, as the electric propulsion system is typically capable of supplying sufficient torque to propel the vehicle in many low-speed manoeuvres, parallel mode operation may be inefficient.

Accordingly, another approach is to allow the electric-only mode to be selected when the drivetrain is configured in the low-range mode, and automatically switch to the parallel mode when additional power is demanded, for example by a driver pressing an accelerator pedal towards its maximum extent. Although this provides a useful compromise to some degree, the unpredictable nature of the mode transitions may negatively impact the driver's perception of the vehicle response.

The present invention has been devised to mitigate or overcome at least some of the above-mentioned problems.

SUMMARY OF THE INVENTION

According to an aspect of the present invention there is provided a method of controlling a vehicle, the vehicle comprising a hybrid powertrain including an electric propulsion system, an engine and a drivetrain that is configurable in a low-range mode or a high-range mode. The method comprises determining whether the low-range mode for the drivetrain is selected, determining whether an electric mode for the powertrain is selected, and inhibiting operation of the engine if both the low-range mode and the electric mode are selected.

It is noted that 'inhibiting' operation of the engine entails preventing activation of the engine, for example by transitioning to a different operating mode for the powertrain. As an exception, the engine, whilst inhibited, may nonetheless be activated if insufficiently electrical energy is available to power the electric propulsion system.

An advantage of determining whether the low-range mode for the drivetrain is selected, determining whether an electric mode for the powertrain is selected, and inhibiting operation of the engine if both the low-range mode and the electric mode are selected, is that the engine is not unnecessarily activated when both the low-range mode and the electric mode are selected. Enabling the vehicle to remain in electric-only mode advantageously refines control of the vehicle, since the torque output by an electric propulsion system is typically more predictable and controllable than that generated by a combustion engine. This is especially useful during low-speed maneuvering of the vehicle in off-road conditions.

Moreover, inhibiting engine activation in such circumstances renders the vehicle behaviour more predictable from a driver's perspective, which in turn further enhances a sense of refinement.

Determining whether the low-range mode for the drivetrain is selected optionally comprises receiving a signal indicative of a transmission mode request and/or detecting a present transmission mode.

Determining whether the electric mode for the powertrain is selected may comprise receiving a signal indicative of a powertrain operating mode request and/or detecting a present powertrain operating mode.

The low-range mode may be configured to optimise the drivetrain for low-speed manoeuvres and/or off-road driving.

Configuring the drivetrain in the low-range mode may comprise configuring a transfer case of the drivetrain to use a set of low-range gears.

The method may comprise determining a selected vehicle driving mode, for example by receiving a signal indicative of a vehicle driving mode request. The vehicle driving mode may be configured to optimise vehicle operating parameters for a particular terrain, in which case the method may comprise inhibiting operation of the engine if both the low-range mode and the electric mode are selected and the vehicle driving mode corresponds to any one of: a low friction terrain; a wet and/or muddy terrain; and a varied terrain. In such embodiments, the method may also comprise overriding inhibition of engine operation if both the low-range mode and the electric mode are selected and the vehicle driving mode corresponds to loose terrain or rocky terrain. Such methods may also comprise activating engine operation if both the low-range mode and the electric mode are selected and the vehicle driving mode corresponds to loose terrain or rocky terrain.

The method may comprise receiving a signal indicative of a state of charge of a power source that supplies electrical power to the electric propulsion system. The power source may comprise a battery, for example. The method may additionally comprise overriding inhibition of engine operation and activating operation of the engine if the signal indicative of the state of charge of the power source indicates that the power source is depleted, in which case the method may comprise propelling the vehicle using only mechanical power generated by the electric propulsion system, and converting mechanical power generated by the engine into electrical power to charge the power source and/or power the electric propulsion system. Alternatively, the method may comprise operating the powertrain in a parallel mode in which mechanical power generated by the electric propulsion system is combined with mechanical power generated by the engine, and the combined mechanical power is used to propel the vehicle.

The powertrain may have a parallel configuration. The vehicle is optionally a plug-in hybrid vehicle (PHEV), noting that a PHEV typically has a relatively powerful electric propulsion system that is therefore capable of acting as the sole source of motive power during off-road manoeuvres. In contrast, hybrid electric vehicles that rely on regenerative braking or other on-board energy harvesting mechanisms to provide electrical energy typically have less powerful electric propulsion systems.

The invention also extends to a vehicle control system configured to implement the method of the above aspect.

Another aspect of the vehicle provides a control system for a vehicle, the vehicle comprising a hybrid powertrain including an electric propulsion system, an engine and a drivetrain that is configurable in a low-range mode or a high-range mode. The control system comprises a processing module configured to: determine whether the low-range mode for the drivetrain is selected; determine whether an electric mode for the powertrain is selected; and inhibit operation of the engine if both the low-range mode and the electric mode are selected.

The control system may comprise means for receiving one or more signals each indicative of a drivetrain mode or a powertrain mode. Such means may comprise an electronic processor having an electrical input for receiving said one or more signals and an electronic memory device electrically coupled to the electronic processor and having instructions stored therein. The processing module is configured to access the memory device and execute the instructions stored therein such that it is operable to determine whether the low-range mode and the electric mode are selected.

The control system may comprise a drivetrain mode selector configured to enable a user to select the low-range mode, and a powertrain mode selector configured to enable a user to select the electric mode.

The invention also extends to a vehicle comprising the control system of the above aspect.

Other aspects of the invention provide a computer program product executable on a processor so as to implement the method of the above aspect, a non-transitory computer readable medium loaded with such a computer program product, and a processor arranged to implement such a computer program product or the method of the above aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Embodiments of the present invention are suitable for use in hybrid vehicles having multiple modes of operation, and are not limited to any particular type of hybrid vehicle. For example, the present invention may be used with vehicles having powertrains taking a series, parallel or power-split configuration. Embodiments of the invention are also applicable to plug-in hybrid vehicles, which can be charged by an electric charging station, and hybrid vehicles that employ regenerative braking.

Figure 1:
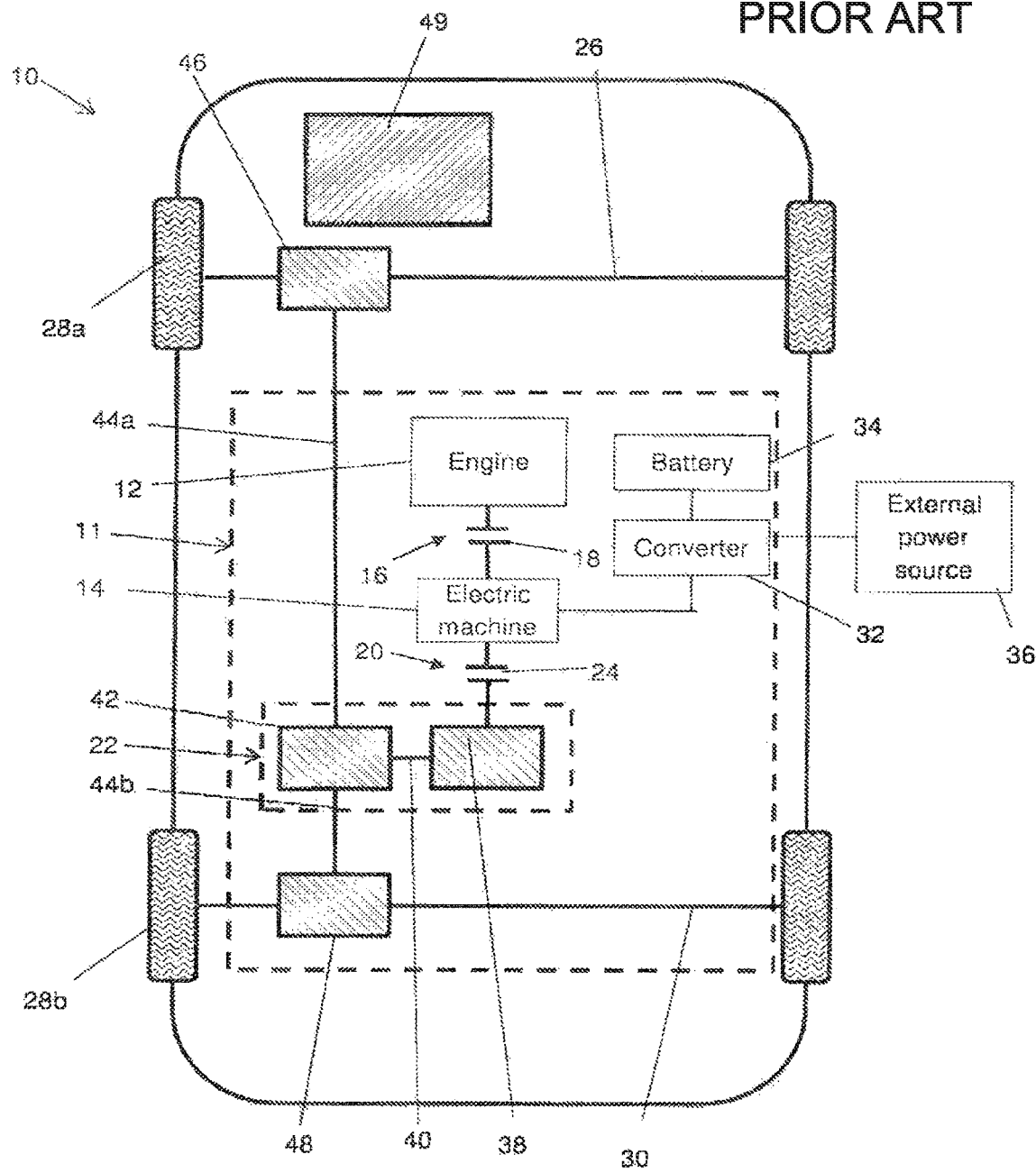
FIG. 1 is a schematic drawing of a known architecture of a plug-in hybrid electric vehicle suitable for use with embodiments of the present invention.

FIG. 1 shows in schematic form a simplified architecture for a plug-in hybrid electric vehicle (PHEV) 10, suitable for use with embodiments of the present invention. As this architecture is well known in the art, it is described in broad terms only so as to provide context for the embodiments of the invention that are introduced subsequently.

The arrangement depicted is of the 'power-split' type that will be familiar to the skilled reader, although as noted above embodiments of the invention could find application in alternative architectures.

The PHEV 10 includes a hybrid powertrain 11 that includes an internal combustion engine 12 arranged to operate in parallel with an electric propulsion system in the form of an electric machine 14 that is operable as either a motor or as a generator.

Specifically, a first output shaft 16 couples the engine 12 to the electric machine 14, allowing the engine 12 to drive the electric machine 14. The first output shaft 16 includes a first clutch 18 that enables the engine 12 to be isolated from the rest of the powertrain 11. In turn, a second output shaft 20 couples the electric machine 14 to a drivetrain 22. The second output shaft 20 includes a second clutch 24 that enables the electric machine 14 to be isolated from the drivetrain 22.

Accordingly, the electric machine 14 can supply torque to the drivetrain 22, either alone or in combination with the engine 12. In turn, the drivetrain 22 transmits torque to a front axle 26 that carries a pair of front road wheels 28a, and a rear axle 30 carrying a pair of rear road wheels 28b.

The electric machine 14 is operable as a generator when driven by the engine 12, to produce electrical energy that is processed by high voltage power electronics defining a converter 32 to be stored in an energy storage means such as a battery 34. In turn, the electric machine 14 can draw power from the battery 34 to produce torque that is transmitted to the drivetrain 22. Any known form of battery suitable for use in a vehicle context may be used, including lithium-ion and other appropriate vehicle battery chemistries, solid-state batteries, capacitors, super-capacitors, ultra-capacitors, and fuel cells.

The battery 34 includes an input 36 configured for connection with an external electrical power source such as a grid supply, enabling full recharging of the battery 34 over an extended period when the PHEV 10 is not in use.

The drivetrain 22 includes a transmission 38, which is configured to manage a combined torque input received from the engine 12 and the electric machine 14 through the second output shaft 20 to provide an appropriate speed ratio between the second output shaft 20 and a transmission output shaft 40. The transmission output shaft 40 is in turn coupled to a transfer case 42, which divides torque between a front driveshaft 44a and a rear driveshaft 44b, to supply power to the front and rear road wheels 28a, 28b respectively at a ratio determined in accordance with a vehicle operating mode and other vehicle operating parameters.

The transfer case 42 includes a normal gear train, which is used during normal driving, and a low-range gear train that is used for low-speed manoeuvres as described above, for example in off-road driving. Accordingly, the drivetrain 22 is configurable in a high-range mode, in which the normal gear train is selected, and a low-range mode, in which the low-range gear train is selected. It is noted that in other embodiments the transfer case may include multiple low-range gear trains, creating multiple corresponding low-range modes to select from.

The front and rear driveshafts 44a, 44b are disposed orthogonally with respect to the front and rear axles 26, 30. So, front and rear differential gears 46, 48 are used to couple the driveshafts 44a, 44b to their respective axles 26, 30 in a manner that accommodates the change in angle. The differential gears 46, 48 may also provide an appropriate rotational speed adjustment between the respective driveshaft 44a, 44b and the axles 26, 30.

The powertrain 11 is configured such that when the engine 12 is inactive, the first clutch 18 can be opened to allow the electric machine 14 to drive the second output shaft 20 alone. In this way, the drivetrain 22 facilitates an isolating arrangement in which the electric machine 14 can drive the drivetrain 22 independently, defining an electric-only mode of operation for the powertrain 11. Alternatively, the engine 12 and the electric machine 14 can operate in parallel to drive the second output shaft 20 simultaneously, defining a parallel mode of operation for the powertrain 11.

In a further operating mode, the electric machine 14 can be operated to generate some electrical energy from a torque input provided by the engine 12, whilst also transmitting some torque to the drivetrain 22. This allows the battery 34 to be charged while the PHEV 10 is moving, for example.

The PHEV 10 also comprises a control system 49 configured to control operation of the powertrain 11. The control system 49 includes a processing module configured to determine a selected mode for the drivetrain 22 and to configure the transfer case 42 accordingly. For example, to determine the drivetrain mode, the control system 49 receives input signals indicative of a selection made by a driver of the PHEV 10, for example through a dedicated switch within a driver cabin or through an infotainment system.

The processing module is also configured to determine a selected operating mode for the powertrain 11, and to operate the powertrain 11 accordingly. Again, determining the selected powertrain mode may entail receiving input signals indicative of a selection made by the driver through a dedicated switch or infotainment system, for example.

It is noted that the drivetrain mode and the powertrain mode may also be determined in accordance with other selections made by the driver and/or indications of other vehicle operating parameters. For example, the low-range mode for the drivetrain 22 may be triggered automatically if the driver activates a terrain response operating mode that is configured to optimise vehicle operating parameters for a particular type of terrain. Alternatively, the powertrain 11 may be forced into the parallel mode if the state of charge of the battery 34 is insufficient to support electric-only operation.

In embodiments of the invention, in contrast with known arrangements operation of the engine 12 can be inhibited by the control system 49 if both the low-range mode and the electric mode are selected.

In this respect, inhibiting engine operation entails preventing a mode transition into the parallel mode to activate the engine 12 unless the operating mode changes or the state of charge of the battery 34 reaches a level that cannot support continued operation in the electric-only mode. This sits in contrast with electric operation for low-range mode implemented in earlier arrangements, in which a transition to the parallel mode can be triggered by, for example, increasing power demand from the driver.

Figure 2:
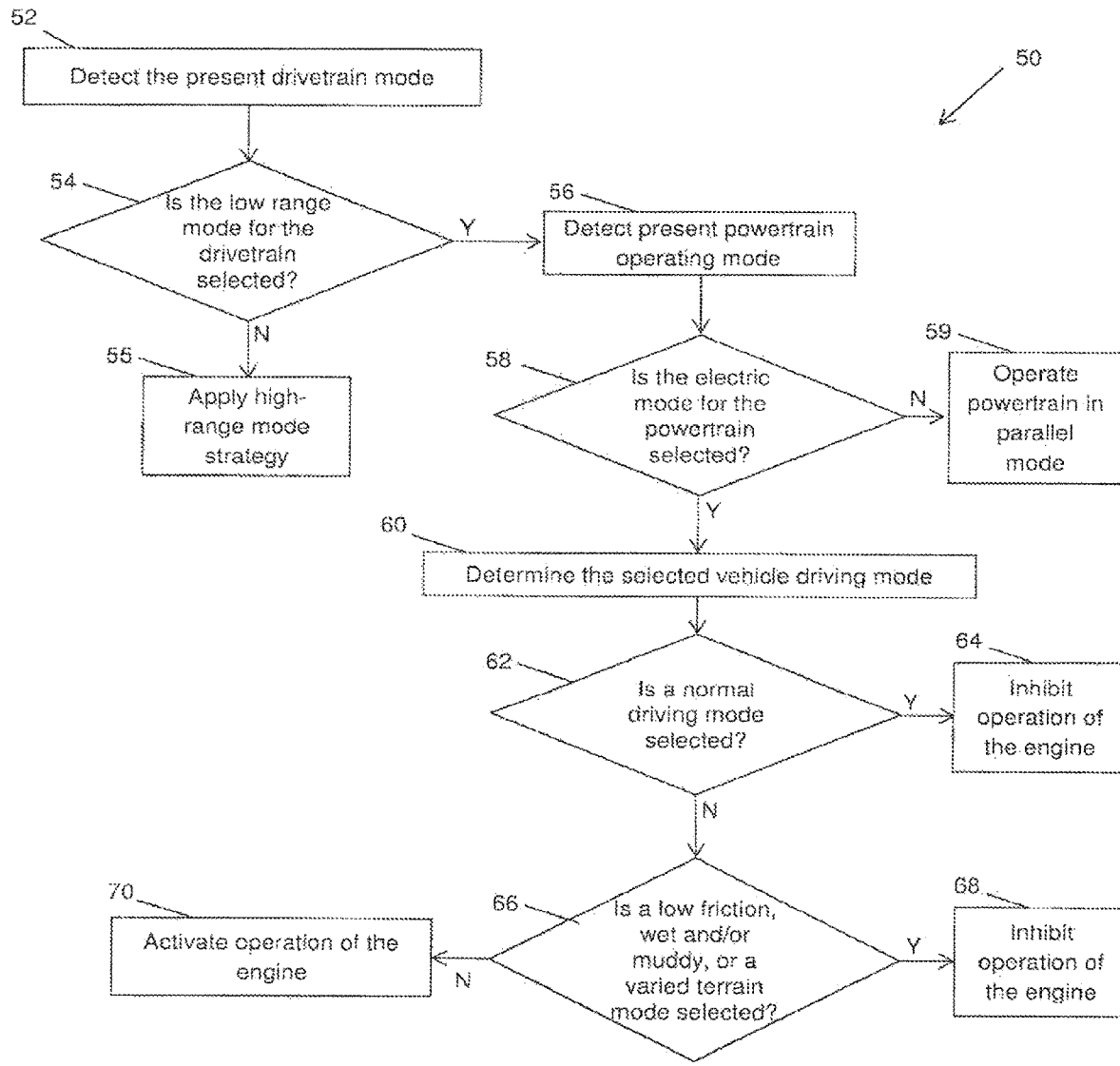
FIG. 2 is a flow diagram representing a process according to an embodiment of the invention for controlling the vehicle of FIG. 1.

Turning now to FIG. 2, a process 50 according to an embodiment of the invention for controlling the vehicle 10 of FIG. 1 is represented in flow diagram form.

The process 50 inhibits the operation of the engine 12 in dependence on a present drivetrain mode, a present powertrain mode, and a selected driving mode of the vehicle 10. Typically, the first clutch 18 is opened when the engine 12 is inhibited.

The process 50 begins with the control system 49 determining at step 52 the present drivetrain mode, specifically whether the low-range mode or the high-range mode is selected. As noted above, detecting the drivetrain mode typically entails receiving a signal indicative of a selected drivetrain mode, or a request to select a drivetrain mode.

If the control system 49 finds that the low-range mode is not selected at decision step 54, the control system 49 operates the powertrain 11 according to a strategy associated with the high-range mode at step 55. Such strategies fall outside the scope of the present invention and so are not considered further.

Alternatively, if the control system 49 finds that the low-range mode is selected for the drivetrain 22, the control system 49 then determines at step 56 the present powertrain operating mode. In the context of the PHEV 10 of FIG. 1, the selected powertrain mode is either the electric-only mode or the parallel mode. In embodiments implemented in different hybrid vehicles other operating modes are possible, including a mechanical mode in which the vehicle is propelled solely by a combustion engine.

When the powertrain 11 is operating in the electric-only mode, the PHEV 10 is propelled using only power generated by the electric propulsion system, namely the electric machine 14. In this operating mode, the engine 12 is not active and the first clutch 18 is opened.

Conversely, when the parallel mode is selected, mechanical power generated by the electric propulsion system may be combined with mechanical power generated by the engine 12 by closing the first clutch 18, and the combined mechanical power may be used to propel the PHEV 10. In a variation within parallel operation, some or all of the torque produced by the engine 12 may be converted into electrical energy by the electric machine 14. This electrical energy is then used to power the electric machine 14 directly and/or to charge the battery 34.

The control system 49 is configured to then determine at decision step 58 whether an electric mode for the powertrain 11 is selected. Decision step 58 may comprise receiving a signal indicative of a powertrain operating mode request, for example, as noted above. If the control system 49 determines that an electric-only mode for the powertrain 11 is not selected, the powertrain 11 is operated in parallel mode at step 59.

The next step in the process 50 is to determine at step 60 the selected driving mode of the PHEV 10, as selected by the driver using switches within a driver environment, or an infotainment system, for example. Determining the selected vehicle driving mode may comprise receiving appropriate signals indicative of a vehicle driving mode request, for example.

The driving mode of the PHEV 10 may be a normal mode for regular on-road driving, for example. Typically, the PHEV 10 may offer a range of 'normal' modes, such as 'drive', 'sport', 'reverse', etc.

Alternatively, the driving mode of the PHEV 10 may include one of multiple terrain response modes that are arranged to configure vehicle parameters such as throttle response, suspension stiffness and drivetrain mode, for off-road driving. Such modes may include: a 'sand' mode, for driving on sand or loose terrain; a 'rock-crawl' mode for driving over rocky terrain where abrupt changes in load are expected; a 'grass/gravel/snow' mode for driving on a low-friction surface; a 'mud and ruts' mode, for driving on terrain that is both relatively low-friction and bumpy; and a 'dynamic' mode, for a varied off-road terrain that is a compromise between features of the other modes.

The specific modes listed above are offered by way of example only, and many variations are possible within the same general principles.

At decision step 62, the control system 49 determines if a normal driving mode is selected. If a normal driving mode is selected, operation of the engine is inhibited at step 64 and the first clutch 18 is opened. In this respect, it is noted that it is assumed that electric-only operation will always be suitable for normal, on-road driving, and so this mode is selected to achieve the associated benefits for low-range manoeuvres already discussed.

If, however, a normal driving mode is not selected, it follows that the driver has configured the PHEV 10 in one of the terrain response modes. In this event, the control system 49 determines at decision step 66 whether or not the vehicle driving mode corresponds to any one of: 'grass/gravel/snow'; 'mud and ruts'; or 'dynamic'. If the vehicle driving mode is determined to correspond to any one of these modes, the control system 49 at step 68 inhibits operation of the engine 12 and opens the first clutch 18.

In this respect, it has been found that the electric machine 14 is capable of delivering sufficient torque for the transfer box 42 to maintain its maximum output torque. Accordingly, operation in electric-only mode in these terrain response modes offers the benefits of enhanced control during low-speed manoeuvres without reducing the torque available and therefore compromising the ability of the PHEV 10 to traverse the indicated terrain type.

Although the electric propulsion system is capable of delivering a maximum level of torque, operating the powertrain 11 in the parallel mode increases the power available. This in turn increases the maximum speed achievable by the road wheels 28a, 28b. Increasing the maximum speed is useful in certain circumstances. However, increased power is often unnecessary and may even be detrimental; for example, when driving on a low-friction surface.

It follows that forced mode transitions when additional power was requested in prior art arrangements were often unnecessary, as drivers tend to request power instinctively when in fact it is torque that is required, for example when climbing a sharp incline. Accordingly, the electric propulsion system would have been capable of handling the manoeuvre and so engine activation was unnecessary in such situations. The present invention beneficially avoids such wasteful transitions, which also improves the predictability of the response of the PHEV 10.

If at decision step 66 the vehicle driving mode is determined to not correspond to any one of these modes, it follows that the vehicle driving mode corresponds to 'sand' or 'rock crawl'. In this embodiment, if the vehicle driving mode is determined to correspond to loose or rocky terrain, and the low-range mode and the electric mode are selected, the control system 49 is configured to ensure that engine operation is not inhibited, and overrides engine inhibition if necessary, for example if the vehicle operating mode has recently been changed from one in which the engine is inhibited.

Ensuring that the engine is not inhibited may entail activating operation of the engine 12, for example. Alternatively, the control system 49 may allow mode transitions as in prior art approaches, so that the engine 12 is activated automatically when additional power is demanded.

The additional power available in the parallel mode may be useful if the terrain is sandy or otherwise loose, to allow the vehicle to maintain high speed to avoid sinking.

Another reason to override inhibition of the engine is to avoid mode transitions during critical manoeuvres, so that such transitions do not alarm the driver as they negotiate a cliff-edge, for example. It is for this reason that engine inhibition is overridden if the 'rock crawl' mode is selected, indicating that the terrain is rocky.

It is to be understood that the method of controlling a vehicle of the present invention is not limited to the process represented by the flow diagram of FIG. 2. In certain embodiments, the control system 49 may be configured to control the PHEV 10 in dependence on the present drivetrain mode and the present powertrain mode only.

For example, the method may determine whether the low-range mode for the drivetrain 22 is selected and whether an electric-only mode for the powertrain 11 is selected, and inhibit operation of the engine 12 if both the low-range mode for the drivetrain 22 and the electric-only mode for the powertrain 11 are selected.

A key advantage of the present invention is that it enables the driver of a hybrid vehicle such as the PHEV 10 of FIG. 1 to have enhanced control of the vehicle at low-range operation by allowing the electric-only mode to be selected. This in turn provides more predictable behaviour that will further enhance the driver's perception of control, in contrast to earlier arrangements where mode transitions may have been triggered unexpectedly.

Moreover, electric-only operation offers more refinement in control, with more predictable torque response, no lag and the ability to generate torque in both directions, all of which enhance manoeuvrability. These features are particularly useful for operations such as reversing to couple to a trailer, and so there is a clear benefit to ensuring that these features are available when operating in a low-range mode.

A related advantage of the electric-only powertrain operating mode of a vehicle is that it enables controllable torque delivery. For example, if a vehicle climbs a steep hill while operating in the electric-only and low-range modes, pressing the accelerator pedal towards its maximum extent provides a predictable increase in torque output up to the maximum that the drivetrain 22 is capable of delivering. This in turn improves the driver's control of the vehicle while climbing the hill.

In contrast, as already noted, in prior art arrangements actuation of the accelerator pedal may trigger activation of the combustion engine, which would not increase the amount of torque applied and may instead disturb torque delivery. The present invention enables the vehicle to drive in electric-only mode at low-range without activation of the engine.

A further advantage is that, as outlined above, inhibiting activation of the engine 12 may be controlled in dependence on the type of terrain surrounding the vehicle. In some terrain types, a transition from electric mode to parallel mode (by activating the engine 12) is not required as applying more power has minimal benefit and maximum torque is already available in electric mode since torque is limited by the transfer case 42.

In certain embodiments, the control system 49 may be configured to determine the state of charge of the battery 34, for example by checking a signal indicative of a state of charge of the battery 34. If the battery 34 is depleted so that electric-only operation cannot be sustained, the control system 49 may be configured to activate operation of the engine 12. The engine 12 can then either supply motive power to propel the vehicle, or be used to drive the electric machine 14 to generate electrical power to charge the battery 34; or a combination of the two.

Many modifications may be made to the above examples without departing from the scope of the present invention as defined in the accompanying claims.

The invention claimed is:

1. A method of controlling a vehicle, the vehicle comprising a hybrid powertrain including an electric propulsion system, an engine and a drivetrain that is configurable in a low-range mode or a high-range mode, the method comprising:
   determining whether the low-range mode for the drivetrain is selected by a user;
   determining whether an electric mode for the powertrain is selected by the users;
   determining a selected vehicle driving mode of a plurality of different vehicle driving modes, wherein the vehicle driving mode is configured to optimize vehicle operating parameters for a particular terrain;
   when the vehicle is in a first subset of the different vehicle driving modes, inhibiting operation of the engine if both the low-range mode and the electric mode are selected by the user, and
   when the vehicle is in a second subset of the different driving modes that is different from the first subset, permitting operation of the engine when both the low-range mode and the electric mode are selected by the user.

2. The method of claim 1, wherein determining whether the low-range mode for the drivetrain is selected comprises receiving a signal indicative of a transmission mode request.

3. The method of claim 1, wherein determining whether the electric mode for the powertrain is selected comprises receiving a signal indicative of a powertrain operating mode request.

4. The method of claim 1, further comprising determining a selected vehicle driving mode.

5. The method of claim 4, wherein determining the selected vehicle driving mode comprises receiving a signal indicative of a vehicle driving mode request.

6. The method of claim 4, wherein the vehicle driving mode is configured to optimize vehicle operating parameters for a particular terrain.

7. The method of claim 1, further comprising receiving a signal indicative of a state of charge of a power source that supplies electrical power to the electric propulsion system.

8. The method of claim 7, further comprising overriding inhibition of engine operation and activating operation of the engine if the signal indicative of the state of charge of the power source indicates that the power source is depleted.

9. A vehicle control system configured to implement the method of claim 1.

10. A computer program product executable on a processor so as to implement the method of claim 1.

11. A non-transitory computer readable medium loaded with the computer program product of claim 10.

12. A processor arranged to implement the method of claim 1.

13. The method of claim 1, wherein determining the selected vehicle driving mode includes a user using switches within a driver environment or an infotainment system.

14. A control system for a vehicle, the vehicle comprising a hybrid powertrain including an electric propulsion system, an engine and a drivetrain that is configurable in a low-range mode or a high-range mode, the control system comprising a processing module configured to:
   determine whether the low-range mode for the drivetrain is selected by a user;
   determine whether an electric mode for the powertrain is selected by the user;
   determine a selected vehicle driving mode of a plurality of different vehicle driving modes, wherein the vehicle driving mode is configured to optimize vehicle operating parameters for a particular terrain;
   when the vehicle is in a first subset of the different vehicle driving modes, inhibit operation of the engine if both the low-range mode and the electric mode are selected by the user; and
   when the vehicle is in a second subset of the different driving modes that is different from the first subset, permit operation of the engine when both the low-range mode and the electric mode are selected by the user.

15. The control system of claim 14, further comprising a drivetrain mode selector configured to enable a user to select the low-range mode.

16. The control system of claim 14, further comprising a powertrain mode selector configured to enable a user to select the electric mode.

17. A vehicle comprising the control system of claim 14.

18. The control system of claim 14, wherein the processing module is configured to determine the selected vehicle driving mode based at least in part on a user using switches within a driver environment or an infotainment system.

* * * * *